(12) United States Patent
Aftanas et al.

(10) Patent No.: US 9,150,160 B2
(45) Date of Patent: Oct. 6, 2015

(54) VEHICLE ARTICLE SYSTEMS AND METHODS

(75) Inventors: Jeffrey M. Aftanas, Ortonville, MI (US); Noel v. Ranka, Canton, MI (US)

(73) Assignee: JAC Products, Inc., Saline, MI (US)

( * ) Notice: Subject to any disclaimer, the term of this patent is extended or adjusted under 35 U.S.C. 154(b) by 197 days.

(21) Appl. No.: 13/592,808

(22) Filed: Aug. 23, 2012

(65) Prior Publication Data

US 2013/0048690 A1 Feb. 28, 2013

Related U.S. Application Data

(60) Provisional application No. 61/526,474, filed on Aug. 23, 2011, provisional application No. 61/533,943, filed on Sep. 13, 2011.

(51) Int. Cl.
*B60R 9/045* (2006.01)
*B60R 9/052* (2006.01)
*B60R 9/058* (2006.01)

(52) U.S. Cl.
CPC .............. *B60R 9/052* (2013.01); *B60R 9/058* (2013.01); *B60R 9/045* (2013.01)

(58) Field of Classification Search
CPC ............ B60R 9/045; B60R 9/06; B60R 9/00; B60R 9/042; B60R 9/05; B60R 9/04; B60R 9/058
USPC .......... 224/314, 316, 319, 321, 324, 328, 329
See application file for complete search history.

(56) References Cited

U.S. PATENT DOCUMENTS

| | | | |
|---|---|---|---|
| 3,181,753 A * | 5/1965 | Fitch | 224/314 |
| 3,940,041 A | 2/1976 | Bott | |
| 4,640,450 A * | 2/1987 | Gallion et al. | 224/331 |
| 4,911,348 A * | 3/1990 | Rasor et al. | 224/321 |
| D316,068 S | 4/1991 | Rasor et al. | |
| D319,810 S | 9/1991 | Stapleton et al. | |
| D319,995 S | 9/1991 | Stapleton et al. | |
| 5,071,050 A | 12/1991 | Pudney et al. | |
| 5,096,106 A | 3/1992 | Foster et al. | |
| 5,207,365 A * | 5/1993 | Bott | 224/316 |
| 5,732,864 A | 3/1998 | Stapleton et al. | |
| 6,382,480 B1 | 5/2002 | Egly et al. | |
| 6,766,928 B2 | 7/2004 | Aftanas et al. | |
| 6,827,244 B1 * | 12/2004 | Stapleton et al. | 224/310 |
| 8,096,454 B2 * | 1/2012 | Aftanas et al. | 224/321 |
| 8,640,933 B1 * | 2/2014 | McCray | 224/310 |
| 2002/0185506 A1 * | 12/2002 | Kmita et al. | 224/310 |

* cited by examiner

*Primary Examiner* — Brian D Nash
*Assistant Examiner* — Corey Skurdal
(74) *Attorney, Agent, or Firm* — Harness, Dickey & Pierce, P.L.C.

(57) ABSTRACT

A vehicle article may have cross bars that may be nestably secured together on a trunk lid of a vehicle when not in use, and yet quickly and easily attached to elements mounted in roof ditches on the roof of the vehicle when needed for use. In another embodiment the vehicle article carrier includes a pair of pivotally secured support rails that are supported from frame or body structure of the vehicle below and adjacent the rear bumper of the vehicle. The support rails may be pivoted into stowed positions when not needed to hide them from view, and then quickly and easily pivoted out when needed for use. Attachments such as a cargo box or a bicycle carrier may be easily secured to the support rails.

13 Claims, 17 Drawing Sheets

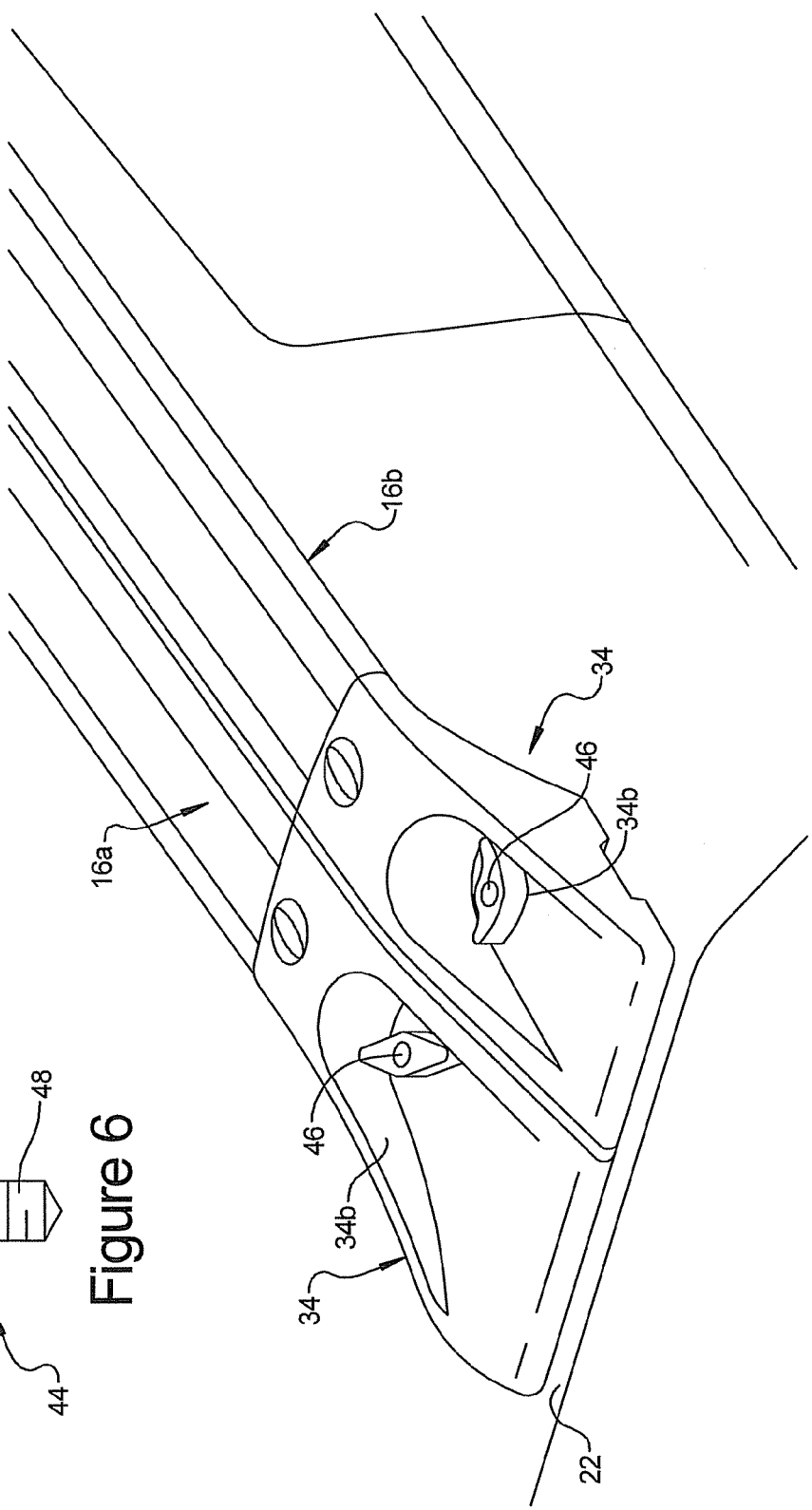
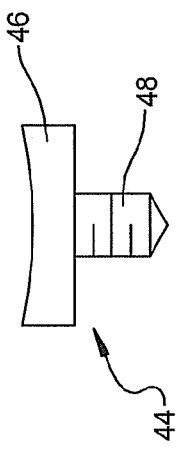

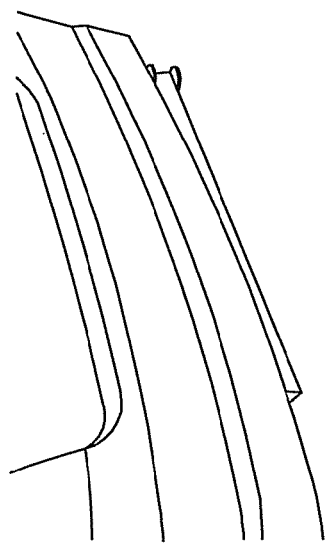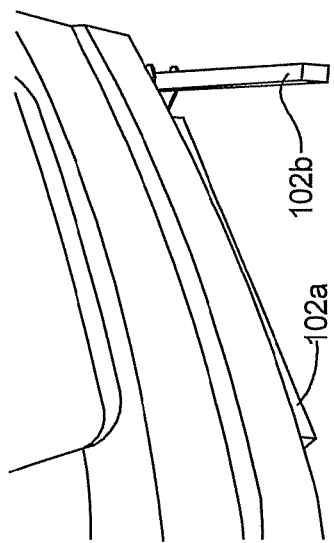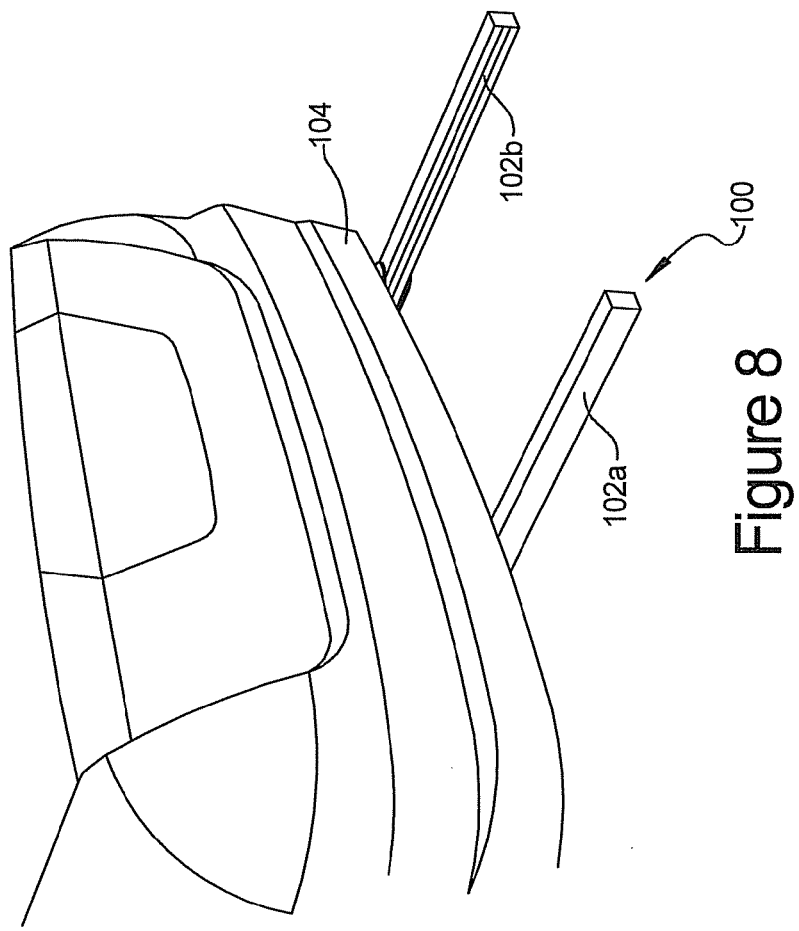

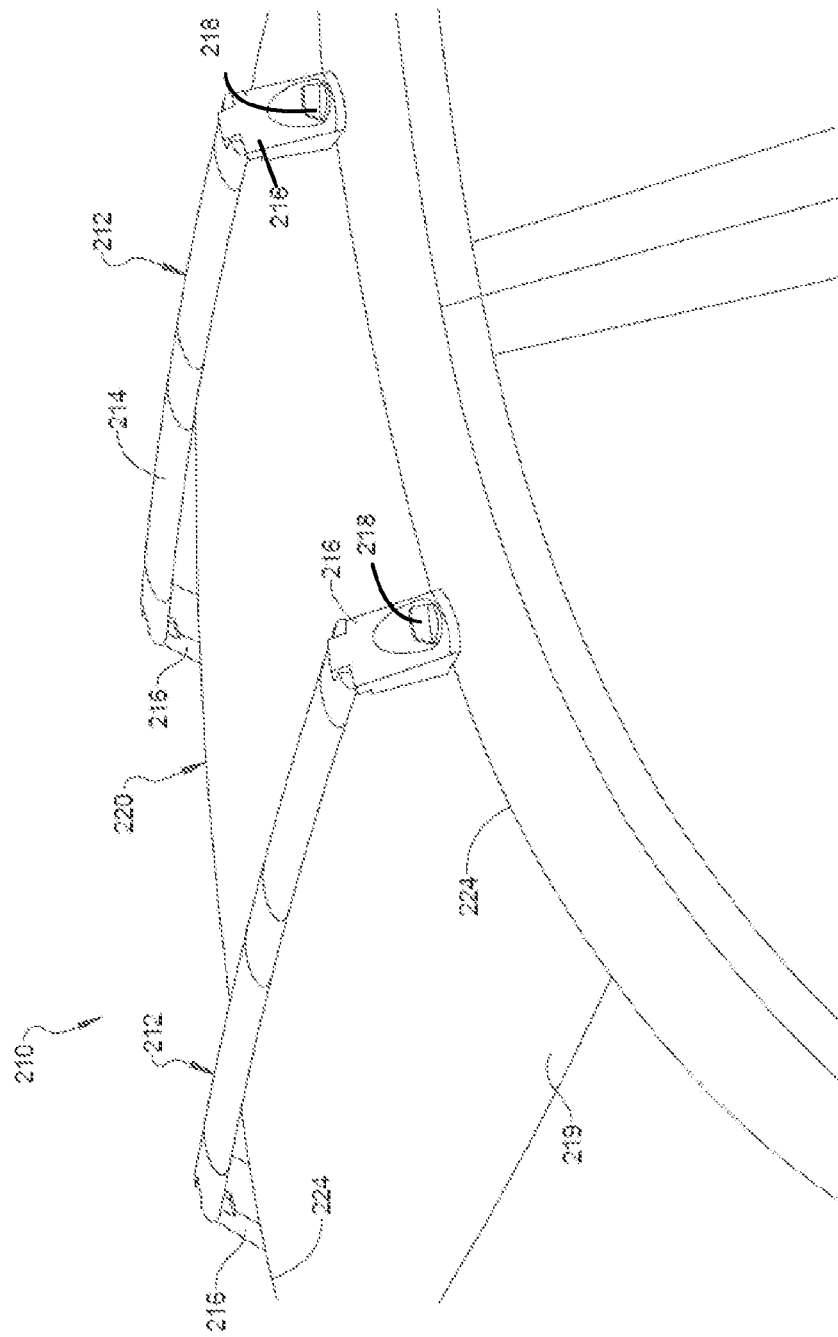

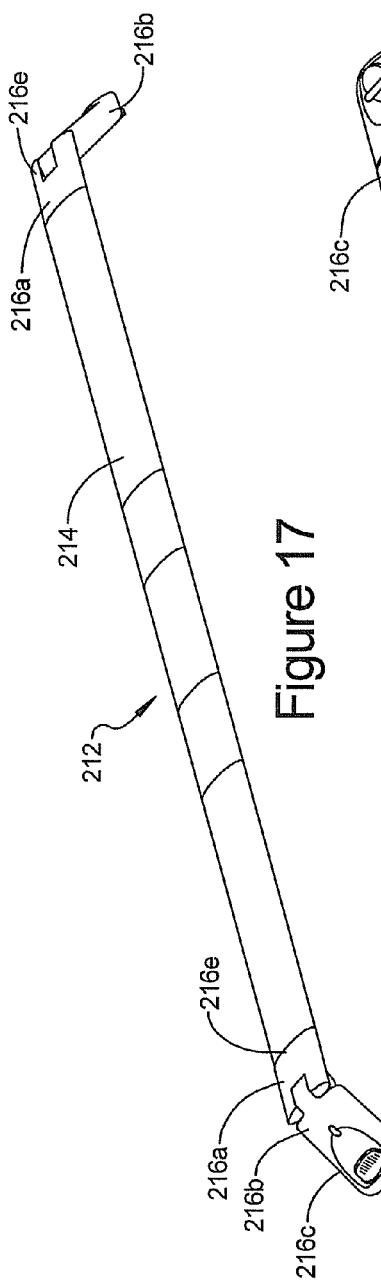
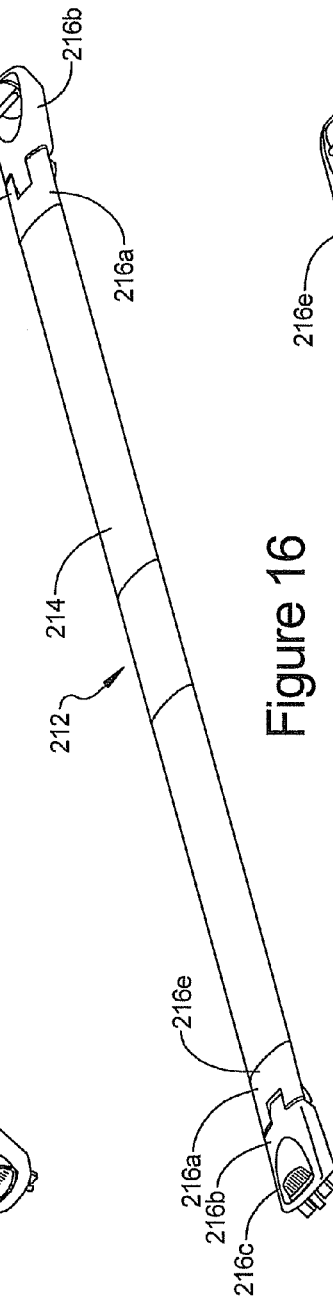
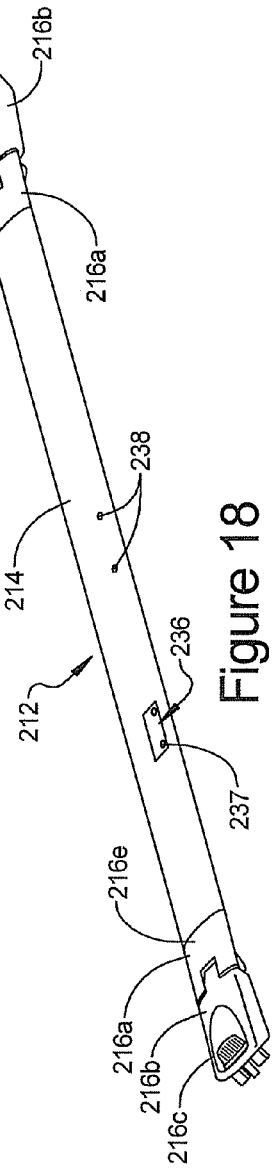
Figure 17
Figure 16
Figure 18

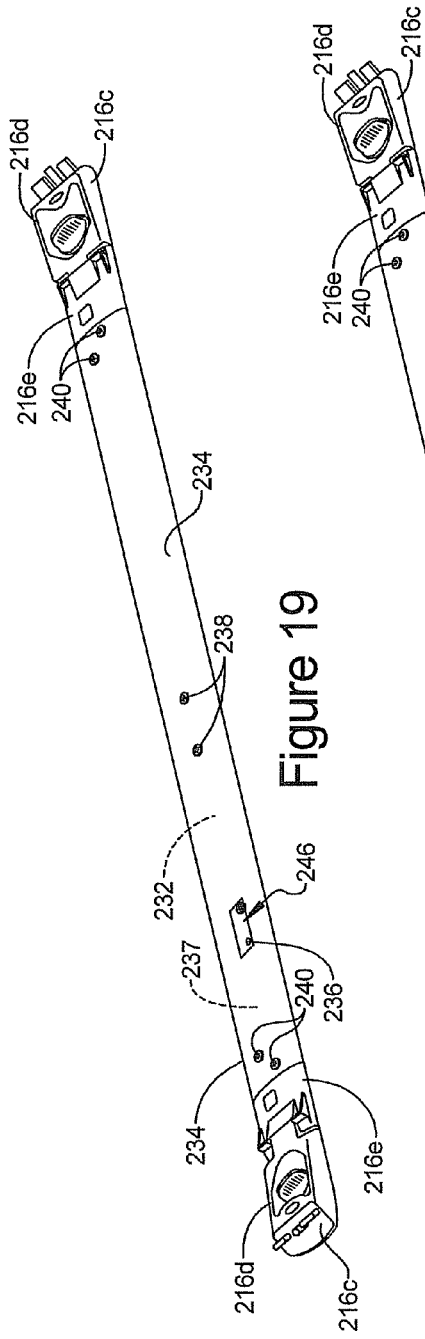
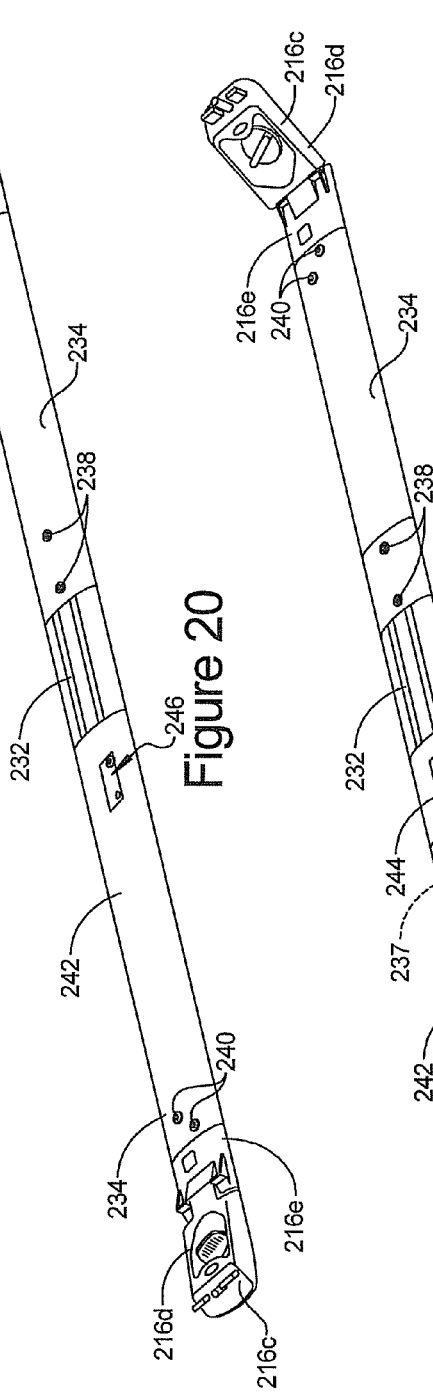
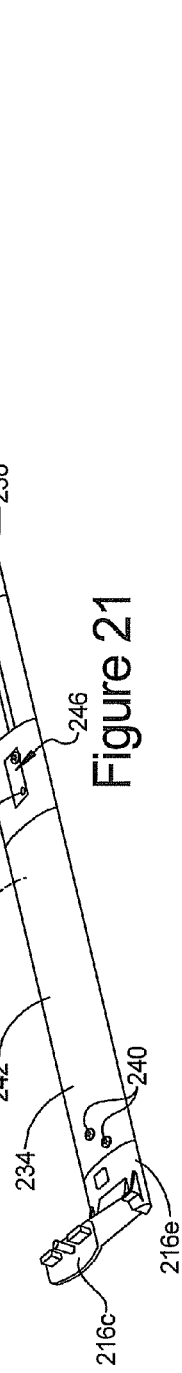

VEHICLE ARTICLE SYSTEMS AND METHODS

CROSS-REFERENCE TO RELATED APPLICATIONS

This application claims the benefit of U.S. Provisional Application No. 61/526,474, filed on Aug. 23, 2011. This application also claims the benefit of U.S. Provisional Application No. 61/533,943, filed on Sep. 13, 2011. The entire disclosures of each of the above applications are incorporated herein by reference.

FIELD

The present disclosure relates to vehicle article carrier systems, and more particularly to vehicle article carrier systems that are adapted to be stowed when not in use, and more particularly stowed in a manner that makes them either inconspicuous or generally hidden from view.

BACKGROUND

The statements in this section merely provide background information related to the present disclosure and may not constitute prior art.

Vehicle article carriers are used with motor vehicles to support variously sized articles thereon. Such carriers may be used with sedans, SUVs, mini-vans, hatchbacks, etc. When used with sedans, the vehicle article carrier is typically positioned over the roof of the vehicle. Typically a pair of side rails of the vehicle article carrier is permanently secured to the vehicle roof to run parallel to one another and along the major longitudinal axis of the vehicle. Typically a pair of cross bars is then mounted on side rails to extend perpendicular to the major longitudinal axis of the vehicle. In many instances the cross bars may be removed from the side rails when use of the vehicle article carrier is not needed, but this leaves the side rails mounted on top of the vehicle. Moreover, when the cross bars are removed while the vehicle owner is away from his/her home, then the cross bars must be stored inside the vehicle or in the trunk of the vehicle. As the cross bars may be typically between three to five feet or so in overall length, this can take up valuable space within the interior of the vehicle or within its trunk.

In other instances the size or shape of the article or cargo that the vehicle owner needs to transport on the vehicle article carrier may make it difficult for the owner to position the article or cargo on the vehicle's roof, or may require two individuals to lift and position the cargo over the roof of the vehicle. In such instances a roof mounted vehicle article carrier may be of limited use to the vehicle owner. Presently there are cargo supporting platforms that may be inserted into a receiver of a hitch mounted on a vehicle. Such platforms thus are supported from the receiver and project outwardly from, and below, the rear bumper of the vehicle. Since they positioned relatively close to ground, this can make it considerably easier for the user to load heavy or large cumbersome items, which might otherwise require two individuals (or possibly the use of a ladder) if the cargo needed to be lifted over the roof and positioned on a conventional roof-mounted article carrier system. However, hitch-mounted cargo platforms are relatively heavy and are impractical to leave attached to the hitch of the vehicle full time. Such platforms can also impede use of the trunk because the user is not able to stand directly behind the rear bumper when loading items into the trunk or unloading items from the trunk. Still further, such cargo platforms can take up considerable storage space when not in use, and may occupy a good amount of the available space in the trunk of a vehicle when not in use. And whether one attempts to store them in the trunk of the vehicle or in one's garage, the weight of such platforms can make handling them (i.e., removal or attachment to the vehicle) difficult or cumbersome, or in some cases impossible for smaller individuals, females or individuals with a disability.

SUMMARY

In one aspect the present disclosure relates to a vehicle article carrier system for supporting articles above a roof of a vehicle, where the vehicle includes a trunk having a trunk lid. The system may comprise a plurality of mounting fasteners adapted to be secured to the roof surface, as well as a plurality of attachment elements secured to the trunk lid. At least one cross bar assembly may be included which has a central telescoping section and an end support at each end of the central telescoping section. The end supports may be pivotally coupled to the ends of the central telescoping portion and each end support may include an associated locking element. In a first configuration, the locking elements are secured to the plurality of mounting fasteners to secure the cross bar assembly above the roof and in position to support articles thereon above the roof. In a second configuration, the cross bar assembly has its locking elements secured to the attachment elements on the trunk lid to support the cross bar assembly from the trunk lid. The cross bar assembly is configured to enable a telescoping action to enable the cross bar assembly to be configured with a first length when positioned on the mounting fasteners, and a second length which is less than the first length when the cross bar assembly is secured to the trunk lid.

BRIEF DESCRIPTION OF THE DRAWINGS

The drawings described herein are for illustration purposes only and are not intended to limit the scope of the present disclosure in any way.

FIG. 5 is a perspective view of end portions of the two cross bars mounted in their stowed configuration, with both covers of the end supports removed;

FIG. 6 is a side elevational view of the attachment element used to secure the cross bar to the trunk lid or the roof of the vehicle;

FIG. 8 is another embodiment of the present disclosure relating to a vehicle article carrier system that is secured to a lower rear body or frame portion of the vehicle, and where the system includes support rails that are foldable so that they can be concealed under a rear bumper area of the vehicle when not needed for use;

FIG. 9 is a perspective view of the article carrier system of FIG. 8 but with the rails partially collapsed into the stowed orientation;

FIG. 10 is a perspective view of the system of claim 9 showing the support rails fully collapsed into the stowed configuration;

FIG. 14 is a perspective view of a portion of an automotive vehicle, which in this example is a sedan, that includes an embodiment of the article carrier system of the present disclosure mounted thereon, and further illustrating a pair of cross bar assemblies secured in operative positions on a roof of the vehicle and ready for use;

FIGS. 16-18 are top perspective views of one of the cross bar assemblies shown in FIG. 14 illustrating its telescoping ability and the pivoting feature of its end supports;

FIG. 19-21 are bottom perspective views of the cross bar assembly of FIGS. 16-18;

DETAILED DESCRIPTION

Figure 1:
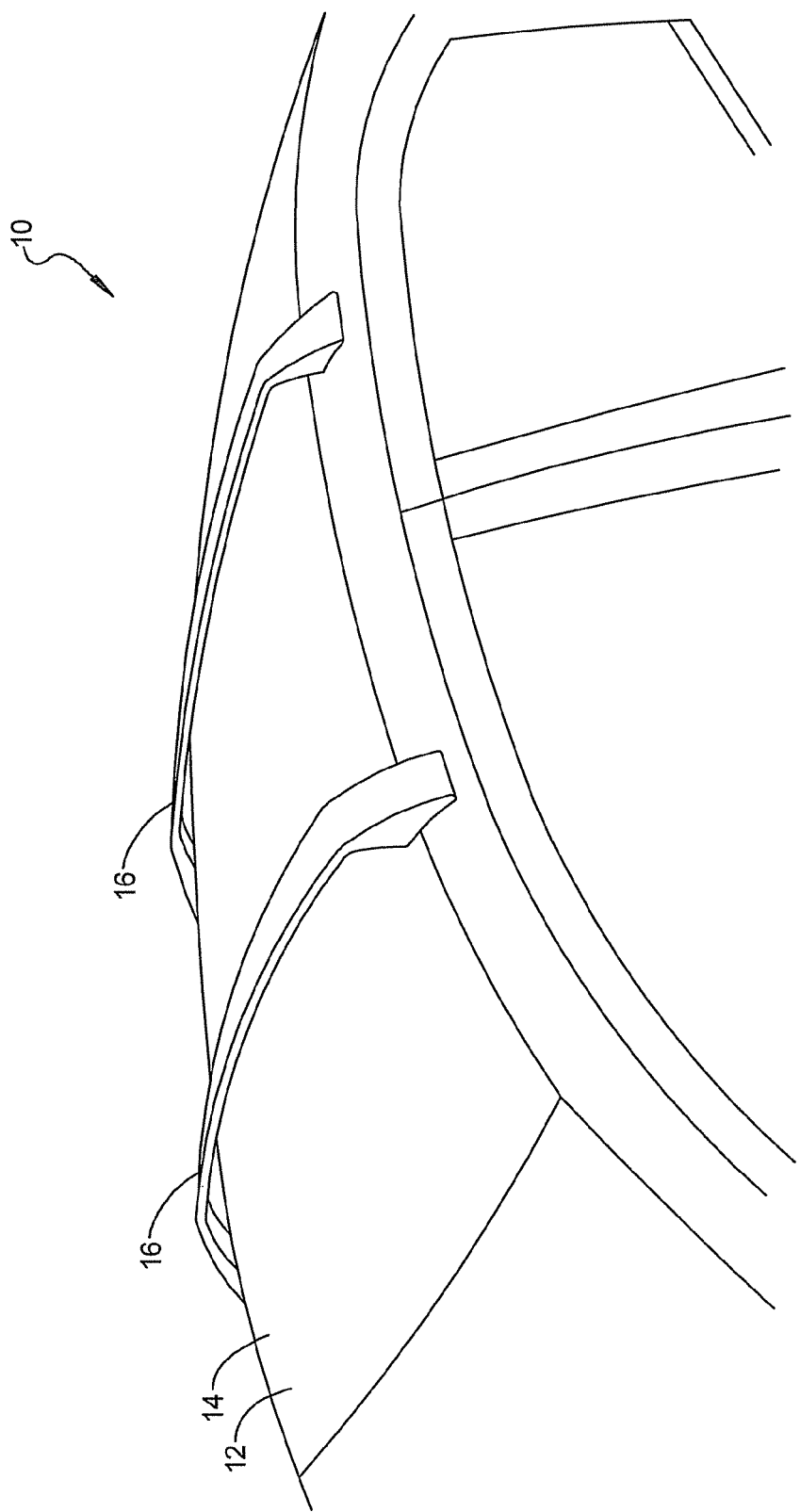
FIG. 1 is a perspective view of a motor vehicle, in this example a sedan, with one embodiment of a vehicle article carrier of the present disclosure secured to the roof of the vehicle and ready for use.

The following description is merely exemplary in nature and is not intended to limit the present disclosure, application, or uses. It should be understood that throughout the drawings, corresponding reference numerals indicate like corresponding parts and features.

Referring to FIG. 1 there is shown a vehicle article carrier system 10 in accordance with one embodiment of the present disclosure. The system 10 is installed on a roof 14 of a motor vehicle 12, which in this example is a sedan. The system includes a pair of cross bars 16a and 16b, which may be referred to collectively herein simply as "cross bars 16". Cross bar 16a may also be referred to herein as the "forward" cross bar 16a while cross bar 16b may be referred to herein as the "rear" cross bar 16b. The cross bars are removably mounted to the roof 14 and made from high aluminum or high strength plastics, or a combination of both, so that they are relatively light in weight and easily handled by a single individual. The cross bars 16 each have a length such that they are able to be positioned perpendicular to a major longitudinal axis of the vehicle and span over the roof 14 between a pair of roof ditches 20. With brief reference to FIG. 2, the cross bars 16 are removably secured by fasteners associated with each cross bar 16a, 16b (to be discussed further in the following paragraphs) to cooperative mounting fasteners 18 that are mounted in the roof ditches 20 (not visible in FIG. 1). The mounting fasteners 18 may take a wide variety of forms such as threaded fasteners (either male or female configuration), but preferably are recess mounted in the roof ditches 20 so that they are not hidden from view when the cross bars 16 are not mounted thereto. At least one mounting fastener 18 is used for each end of each of the cross bars 16, however, a pair of mounting fasteners 18 can just as readily be employed to secure each end of the cross bar 16 to its associated roof ditch 20.

Since the roof ditches 20 will each typically include weather stripping or some form of plastic member that substantially fills the ditch, it will be appreciated that portions of the weather stripping or plastic member will need to be removed to provide access to the fasteners 18. Optionally, some type of removable decorative cover may be placed over each the fasteners 18 when the cross bars 16 are not secured to the mounting fasteners 18. Optionally, each of the fasteners 18 could be constructed with some type of moveable cover portion that may simply be slid or rotated to expose the fastener when an end of one of the cross bars 16 is to be attached to the fastener 18.

Figure 3:
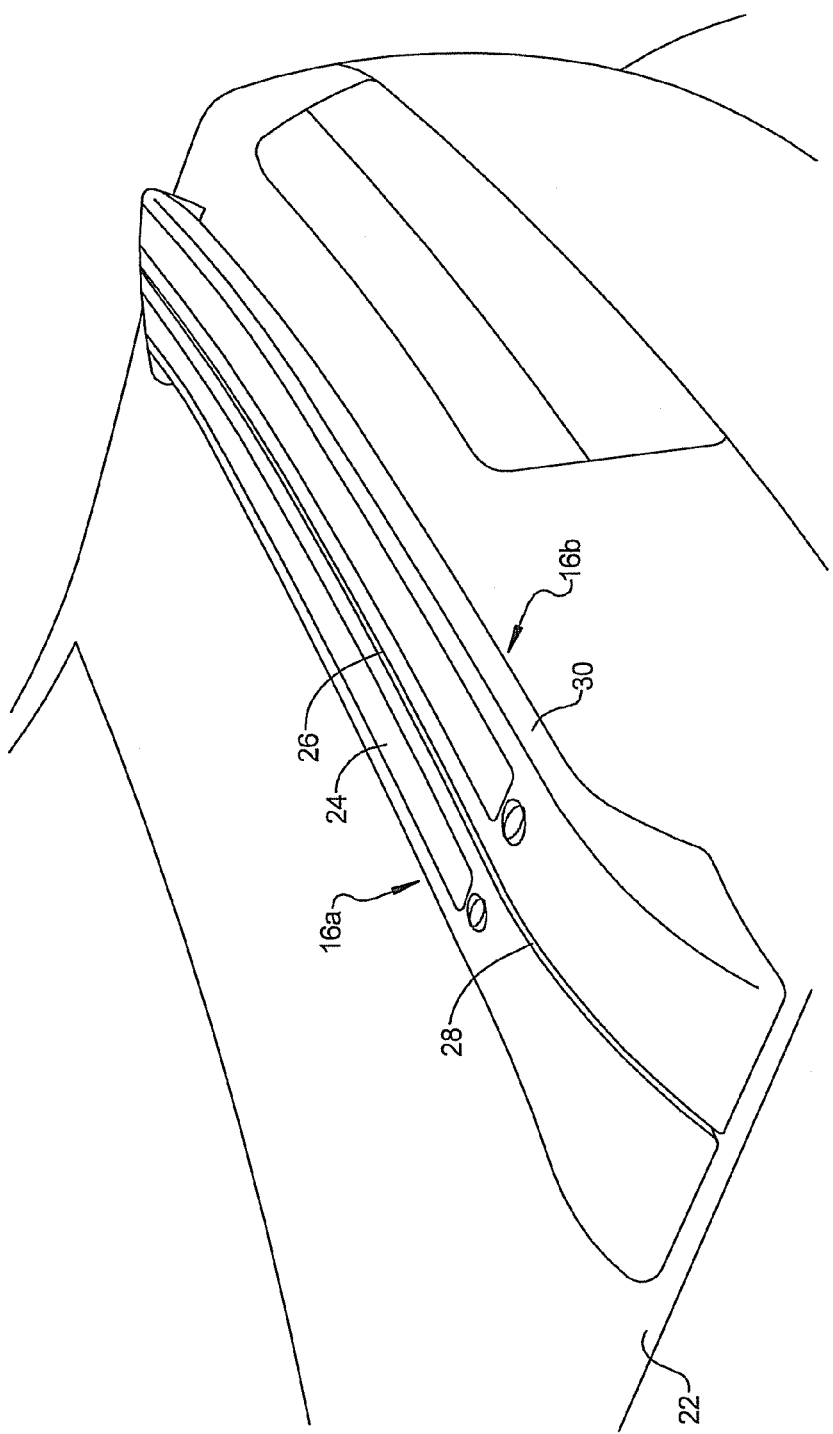
FIG. 3 is a perspective view showing the forward and rear cross bars secured to the trunk lid in the stowed configuration, wherein the two cross bars form a spoiler.

Referring now to FIG. 3, the cross bars 16 are shown mounted in their stowed position to a trunk lid 22 of the vehicle 12. It will be immediately apparent that the cross bars 16 cooperatively assume the shape of a single spoiler when they are mounted on the trunk lid 22. The forward cross bar 16a has a leading edge 24 and a trailing edge 26, while the rear cross bar 16b also has a leading edge 28 and a trailing edge 30. The leading edge 24 of the forward cross bar 16a may have an aerodynamic shape similar to what the leading edge of a conventional vehicle spoiler would have. The trailing edge 26 of the forward cross bar 16a and the leading edge 28 of the rear cross bar 16b are formed so that they "nest" together when they are secured to the trunk lid 22. The trailing edge 30 of the rear cross bar 16b may have any type of aerodynamic or aesthetically pleasing configuration. The cross sectional configurations of the cross bars 16a, 16b may also be selected such that when they are positioned in the stowed configuration, they effectively function just as a conventional spoiler would. When positioned in the stowed configuration, the cross bars 16 also provide a highly aesthetically pleasing appearance that may complement the styling of the vehicle 12.

Figure 4:
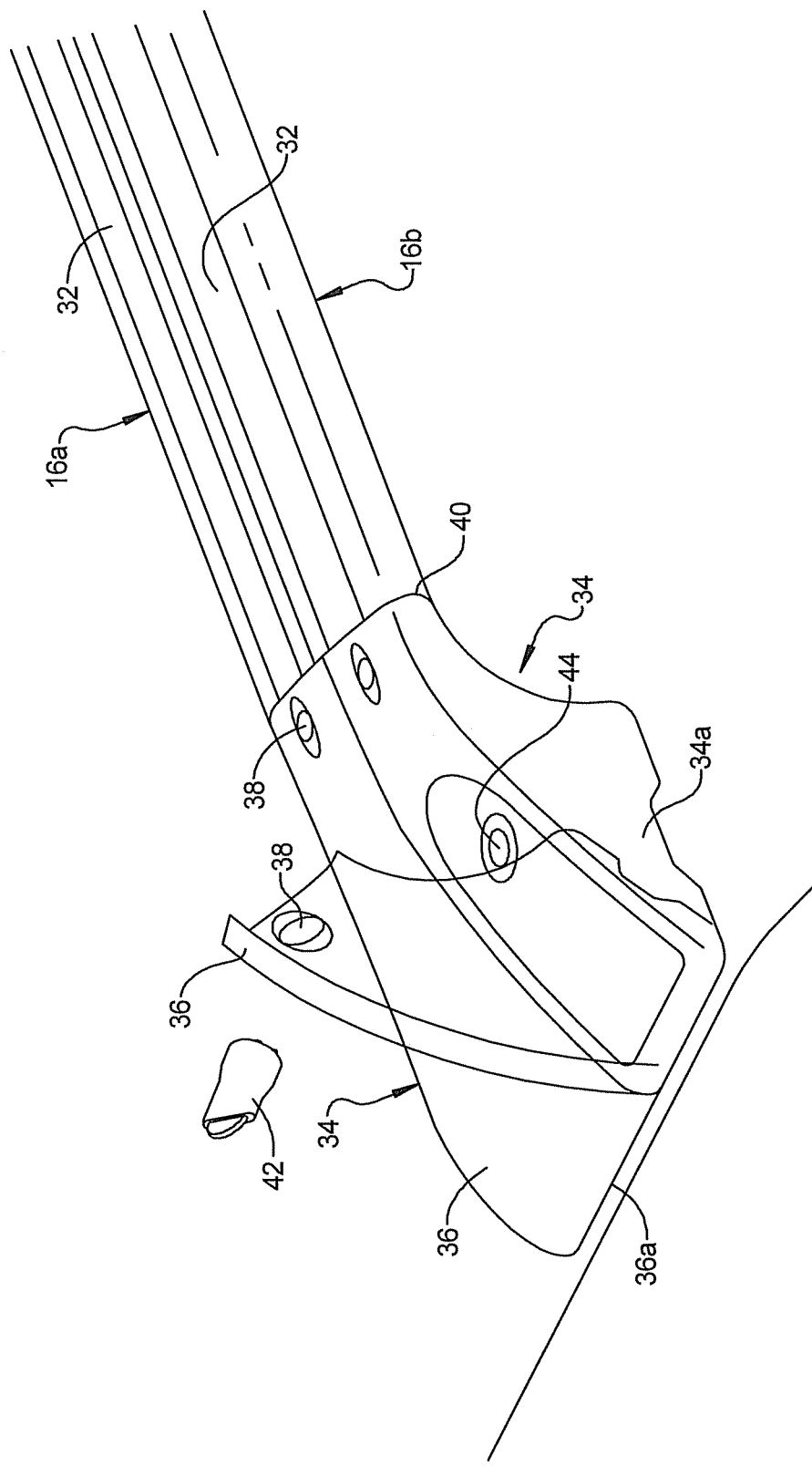
FIG. 4 is a perspective view of a portion of the two cross bars positioned in the stowed configuration, wherein one of the cross bars has its cover shown in phantom lifted partially away from its associated end support revealing the attachment element of the end support.

Referring to FIG. 4, each cross bar 16a, 16b may include a central portion 32 with an end support 34 at the opposing ends thereof. Each end support 34 may be also include a removable cover 36 having a locking element 38 non-removably mounted or attached thereto. The locking element 38 may be used to lock the cover 36 to its associated end support 34 via an opening or locking receptacle 40 that is formed in the end support 34. A key 42 may be provided that is required to engage the locking element 38 and rotate it. When attached, the cover 36 provides a decorative component that hides an underlying attachment element 44 which is used to fasten the cross bar 16a or 16b to one of the fasteners 18. The removable cover 36 may be hingedly mounted a body portion 34a of its associated end support 34, or it may be completely removable if it is provided with suitable tabs along its lower edge 36a that engage with corresponding opening or slots in the body portion 34a. In either construction, the removable cover 36 forms a decorative element that prevents access to the attachment element 44.

Figure 2:
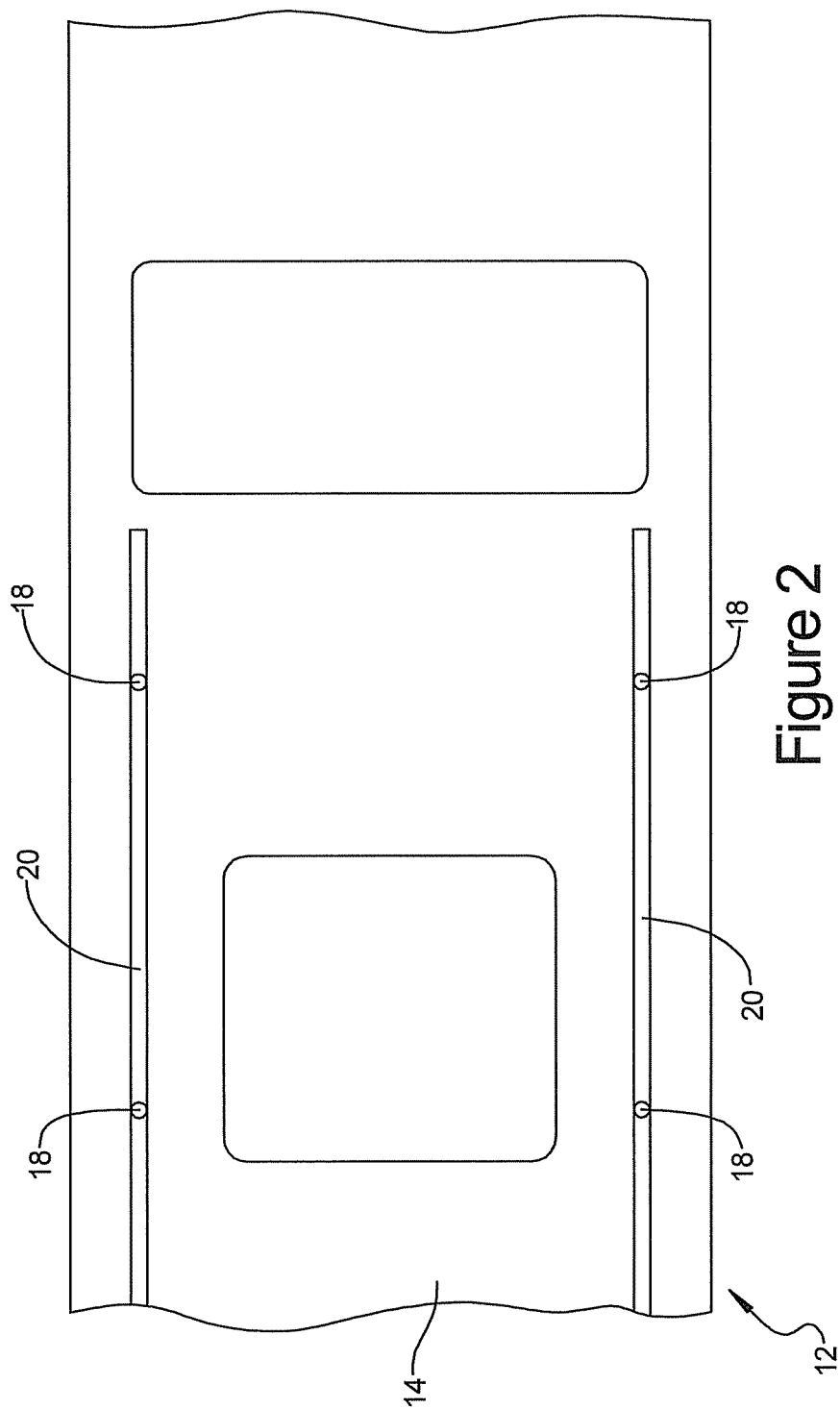
FIG. 2 is a perspective view of the cross bars of the vehicle article carrier of FIG. 1 mounted on the trunk lid of the vehicle showing how the cross bars nest together to cooperatively form the appearance of a spoiler.

Referring to FIG. 5, the attachment elements 44 are shown in greater detail with the removable cover 36 of each end support 34 being completely removed. Each attachment element 44 resides within a pocket or recess 34b formed in the body portion 34a of its associated end support 34. As shown in FIG. 6, each attachment element 44 may include a manually graspable portion 46 that can easily be rotated by grasping it with a thumb and forefinger. A threaded shaft portion 48 is either integrally formed with the manually graspable portion or fixedly attached thereto, and engages with a corresponding threaded portion of one of the fasteners 18 (FIG. 2). Preferably the attachment element 44 is captured by a conventional lock ring (not shown) so that it is not itself removable from its associated end support 34.

Figure 7:
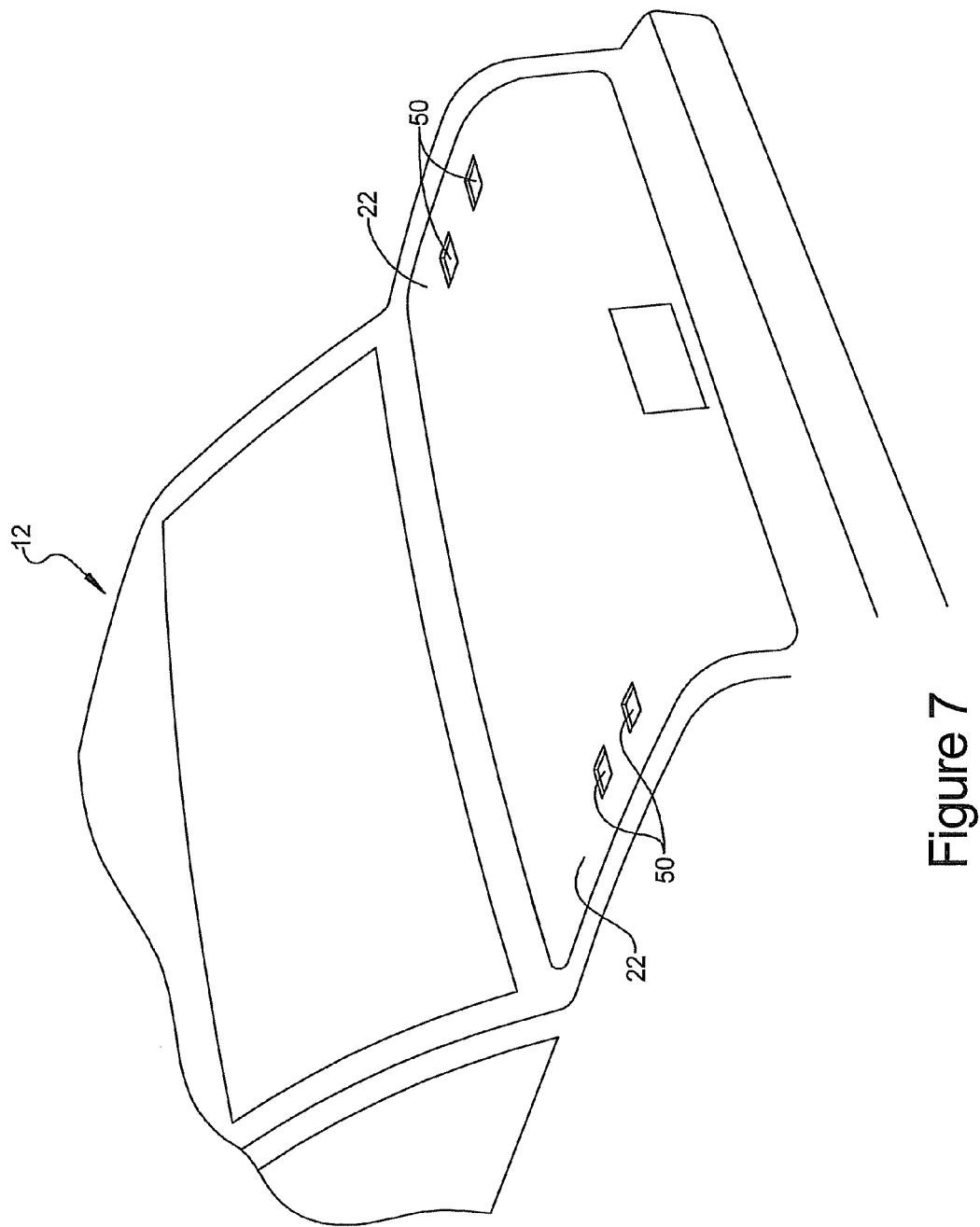
FIG. 7 is a perspective view of the vehicle from the rear illustrating the trunk lid with the cross bars removed there from to show all four attachment elements mounted in the trunk lid.

With brief reference to FIG. 7, the trunk lid 22 is shown with the two cross bars 16a, 16b removed to expose attachment elements 50. Attachment elements 50 may form components having a threaded bore that is able to receive the threaded shaft 48 of one of the end supports 34 of one of the cross bars 16a or 16b. The attachment elements 50 may be recess mounted such that they are mostly hidden from view when viewing the vehicle 12 from the side or rear. Alternatively, the attachment elements 50 may be able to receive decorative plastic strips or decorative plastic cover elements that can be secured thereto to completely cover them when the cross bars 16a, 16b are in use and attached to the roof 14 of the vehicle 12. Since the cross bars 16a, 16b are not used to support any objects when they are mounted in their stowed configuration on the trunk lid 22, there is no need for the trunk lid 22 to be reinforced to handle the weight of articles that the system 10 might normally be used to carry. Put differently, the attachment elements 50 need only be strong enough to securely hold the cross bars 16a, 16b thereto.

It will be appreciated then that the cross bars 16a, 16b may be quickly and easily moved from their stowed configuration on the trunk lid 22, and attached to the mounting fasteners 18, when they are needed for use. One individual can easily handle the cross bars 16a, 16b when they need to be detached and moved into either their stowed or useable configurations. The ability to mount the cross bars 16a, 16b on the trunk lid 22 and use the cross bars as a spoiler means that the cross bars do not need to take up valuable room in the trunk of the vehicle 12 when they are not in use. Also, since the cross bars 16a, 16b are always secured to the vehicle, there is less chance that an occasion will present itself where the cross bars are needed but the user has inadvertently left them at his/her home.

Referring now to FIGS. 8-10, a vehicle article carrier system 100 in accordance with another embodiment of the present disclosure is illustrated. The system 100 includes a pair of support rails 102a and 102b (sometimes collectively referred to hereinafter as "support rails 102) which are pivotally secured to suitable frame or body structure of the vehicle 12 below a rear bumper 104 of the vehicle 12. It is a principal advantage of the system 100 that the support rails 102a, 102b may be pivoted into stowed configurations where they positioned underneath the rear bumper 104 and mostly (or virtually completely) hidden from view to the casual observer. FIG. 9 illustrates the support rail 102a completely folded, and the support rail 102b partially folded, into their stowed positions. FIG. 10 shows the support rails 102a, 102b fully folded into their stowed positions.

Figure 11:
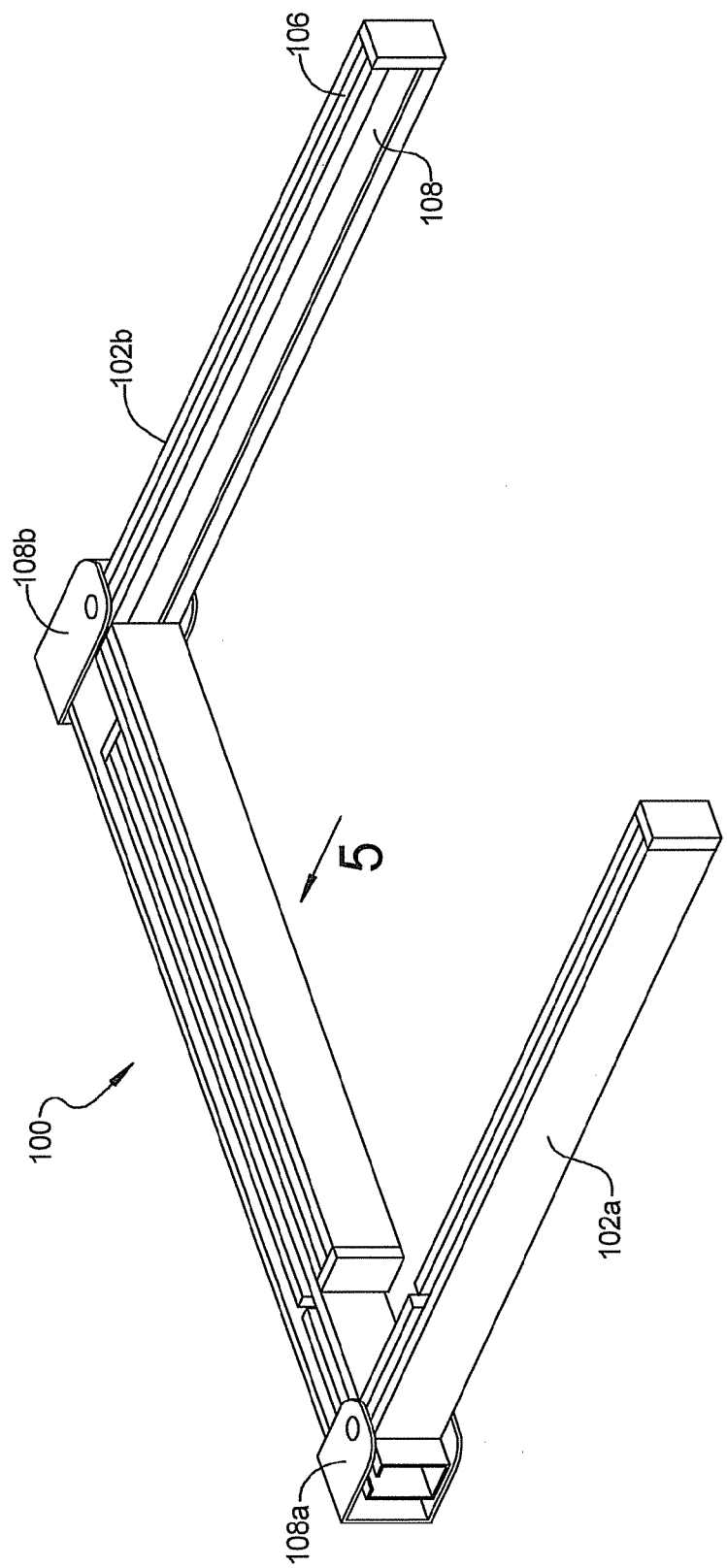
FIG. 11 is a perspective view of the vehicle article carrier system apart from the vehicle to better illustrate its various component parts.

Referring to Figure 1 ithe system 100 is shown completely detached from the vehicle 12 to more illustrate the various components of the system 100. Each of the support rails 102a, 102b may be formed from aluminum or any other suitably strong material and may include one or more channels. For illustrative purposes the support rails 102a, 102b are each shown as including an upper channel 106 and a side channel 108. Alternatively more than two channels could be formed on each support rail 102a, 102. Still further, permanent tie down loops (not shown) could be formed on each of the support rails 102a, 102b provided the tie down loops do not interfere with stowed positioning of the support rails. In FIG. 11 the two support rails 102a, 102b are shown in both their useable and stowed positions, with the stowed position represented by the letter "S". Pivot bracket 108a pivotally supports support rails 102a while pivot bracket 108b pivotally supports support rail 102b. Preferably one of the brackets 108a, 108b, in this example bracket 108b, pivotally supports its associated support rail 102b at a point that is laterally offset from pivot point of the bracket 108a (or vice versa) so that the two support rails are able to be folded basically flat and parallel relative to each other when placed in the stowed configuration. Thus, it will be noted that in this example the pivot bracket 108b is slightly longer in length than pivot bracket 108a. In this example when the two support rails 102a, 102b need to be folded from the useable configuration into the stowed configuration, support rail 102a will need to be folded first into its fully stowed position before pivot bracket 108a is able to be folded into its fully stowed position. When the two support rails 102a, 102b need to be used, then the opposite folding motion is performed; that is, support rail 102b is first pivoted into its fully open position before support rail 102a is pivoted into its fully opened position. Preferably any conventional spring or biasing structure (not shown), and more preferably a conventional over-center type biasing system, is used with each of the support rails 102a, 102b such that the support rails may be held by the biasing system in both their opened and stowed configurations. Thus, when each support rail 102a, 102b is being moved into its useable position, the over center biasing system would cause the pivot member to want to "snap" out into its fully extended position once it moves past a predetermined intermediate point of pivoting travel. And conversely, the over-center biasing mechanism will cause each of the support rails 102a, 102b to want to "snap" into their stowed positions as they are moved from their fully extended positions toward their stowed positions.

Each of the pivot brackets 108a, 108b may be secured to a frame portion or any other suitably strong structure underneath and adjacent the rear bumper. Alternatively, the pivot brackets could potentially be secured to a portion of a hitch structure if the vehicle already has a hitch system installed.

Figure 12:
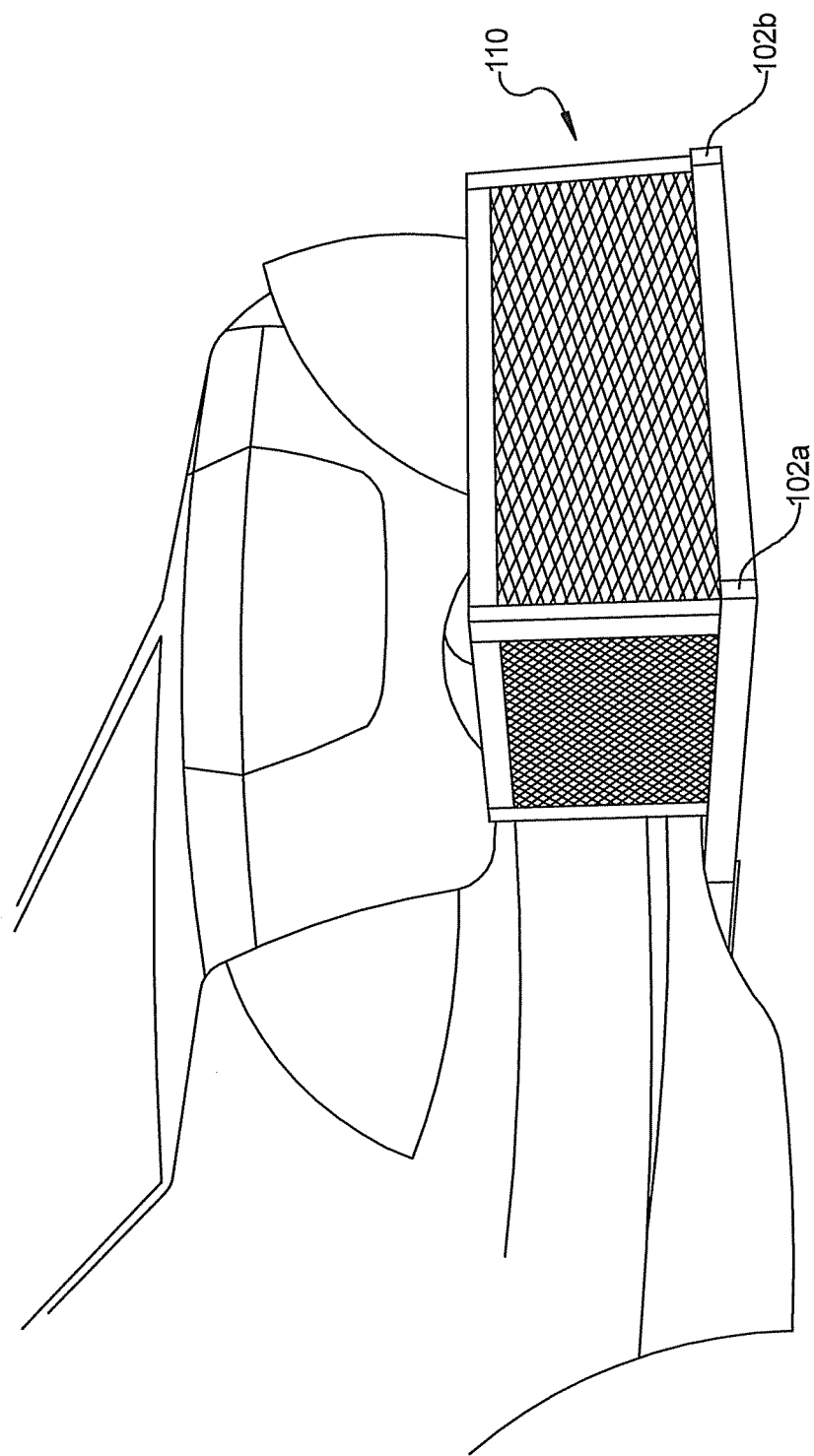
FIG. 12 is a perspective view of a cargo box,secured to the system of FIG. 8.
Figure 13:
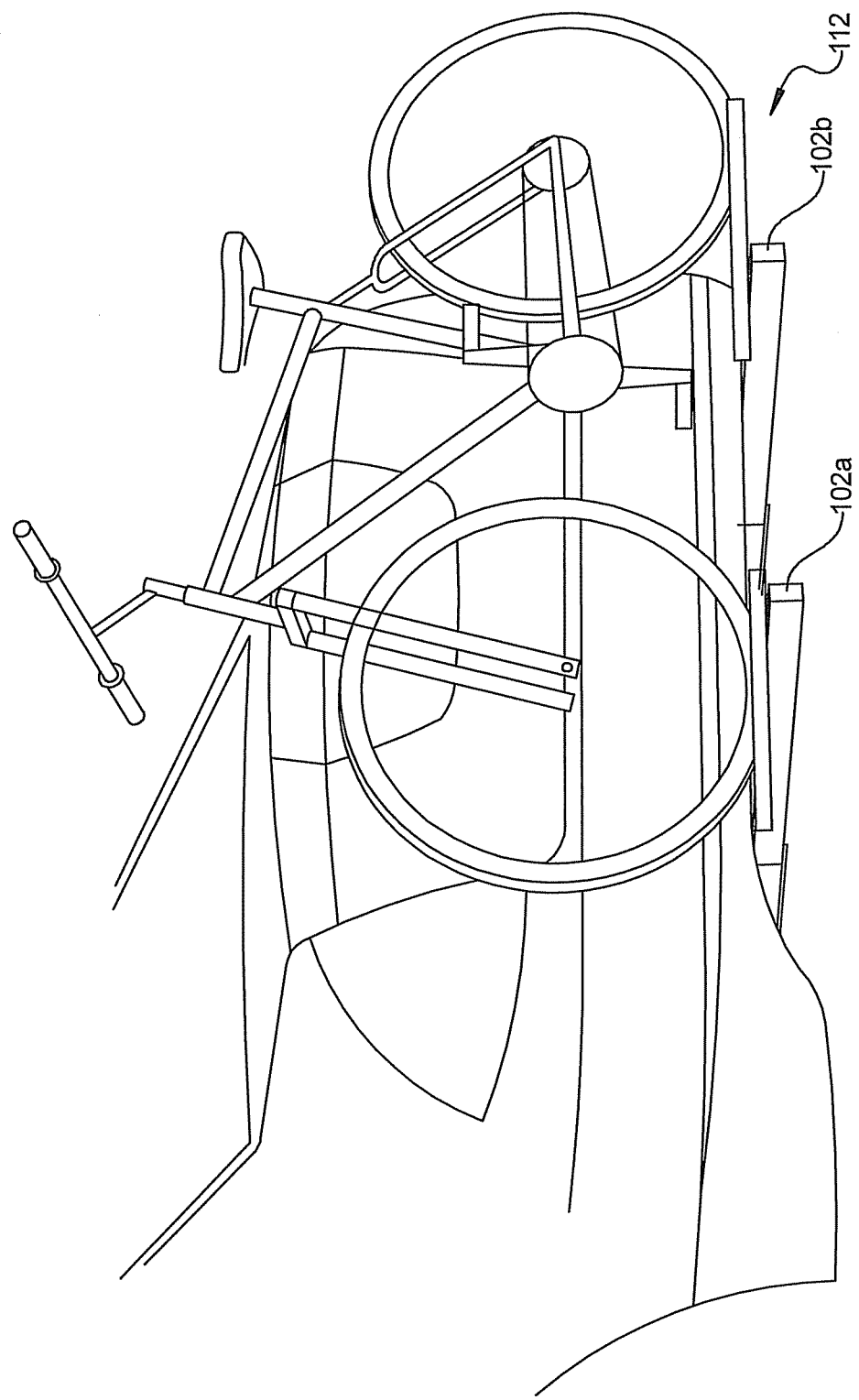
FIG. 13 is a perspective view of a bicycle carrier secured to the system of FIG. 8.

With continuing reference to FIG. 11 each of the support rails 102a, 102b may include one or more integrally formed rails to facilitate the attachment of external carrier devices, such as cargo box 110 shown in FIG. 12 or a bicycle carrier 112 shown in FIG. 13. The cargo box 110 or the bicycle carrier 112 may each be constructed with permanently installed fastening elements that are designed to attach to conventional tap plates (not shown) which are positioned in the upper channels 106 or the side channels 108 of each of the support rails 102a, 102b. Thus, the cargo box 110 or bicycle carrier 112 is able to be quickly and easily attached to the support rails 102a, 102b without the need for any external tools. It will be appreciated that while only two types of article attachment devices (i.e., cargo box 110 and bicycle carrier 112) have been illustrated, that other types of article/cargo attachments could be easily used with the system 100.

A principal advantage of the system 100 is that the support rails 102a, 102b do not need to be detached from the vehicle 12 when not needed, and thus there is no chance that the support rails may not be available for use when needed because they have been left at the vehicle owner's home. The system 100 is preferably constructed from aluminum or steel, or a combination of both metals, such that it is extremely light in weight and does not affect the overall handling or economy of the vehicle. While the system 100 is shown in use on a sedan, it will be appreciated that the system 100 may be used on SUVs, hatchbacks, pickup trucks, minivans, full size vans and other vehicles.

Figure 14A:
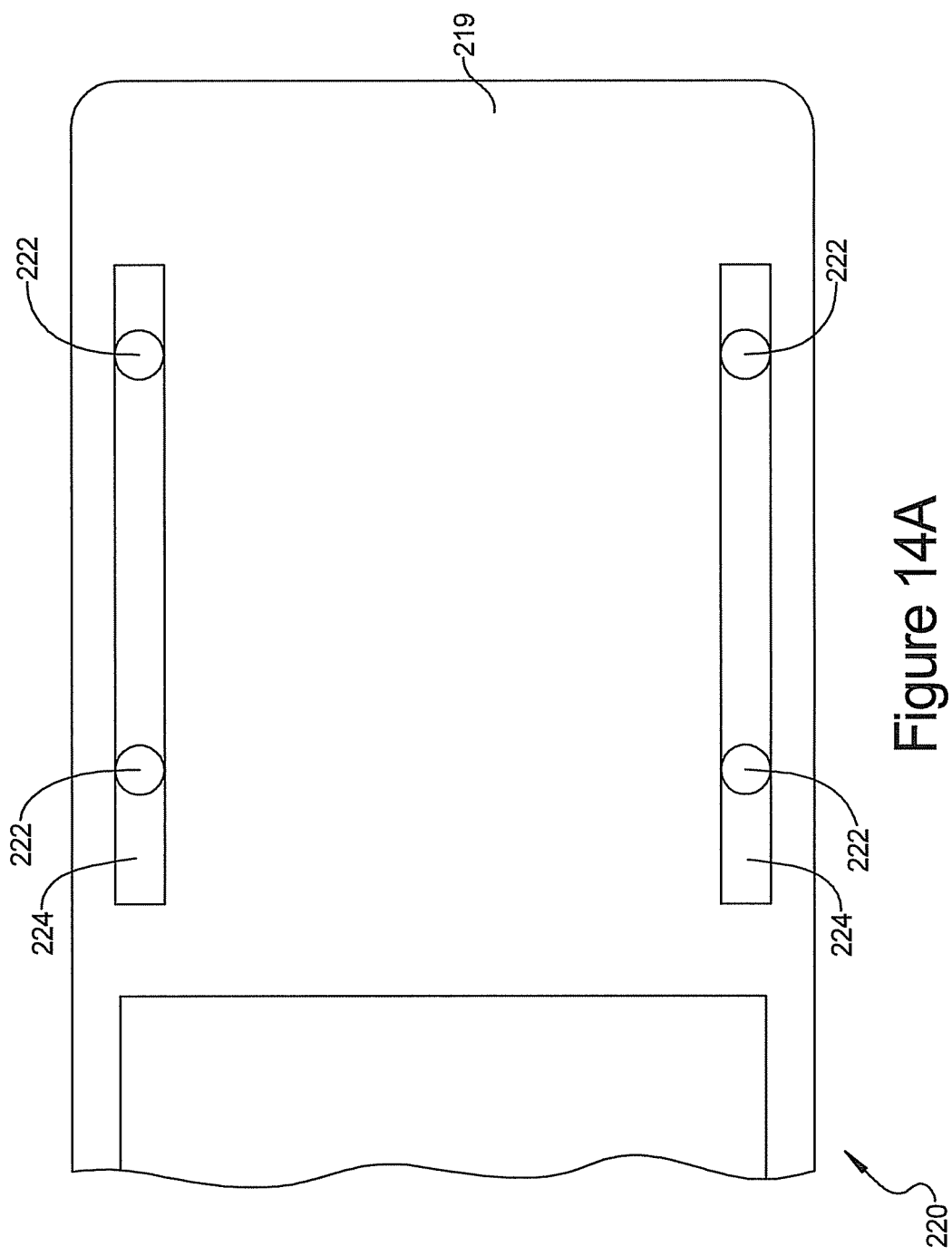
FIG. 14A is a plan view of the roof of the vehicle of FIG. 14 showing the mounting, fasteners positioned in the roof ditches.

Referring to FIG. 14, there is shown a vehicle article carrier system 210 in accordance with another embodiment of the present disclosure. For convenience, the vehicle article carrier system 210 will be referred to throughout the following discussion simply as "the system 210". The system 210 may include a pair of cross bar assemblies 212, which in this example are of identical construction. However, it will be appreciated that the cross bar assemblies 212 need not be of identical construction. Each cross bar assembly 212 has a central telescoping portion 214 with pivoting end supports 216 at its opposing ends. Each of the end supports 216 has a locking element in the form of a locking thumbwheel 218 that can be easily rotated using the fingers of one hand to lock its associated end support 216 to a roof 219 of a vehicle 220. While hidden from view in FIG. 14, the roof 219 includes four mounting fasteners 222, in this example positioned in roof ditches 224 as shown in FIG. 14A, which receive and engage with portions of the locking thumbwheels 218. This enables the cross bar assemblies 212 to be quickly, easily and securely attached to the roof 219. It also allows the cross bar assemblies 212 to be quickly and easily removed from the roof 219 when they are not needed for use.

Figure 15:
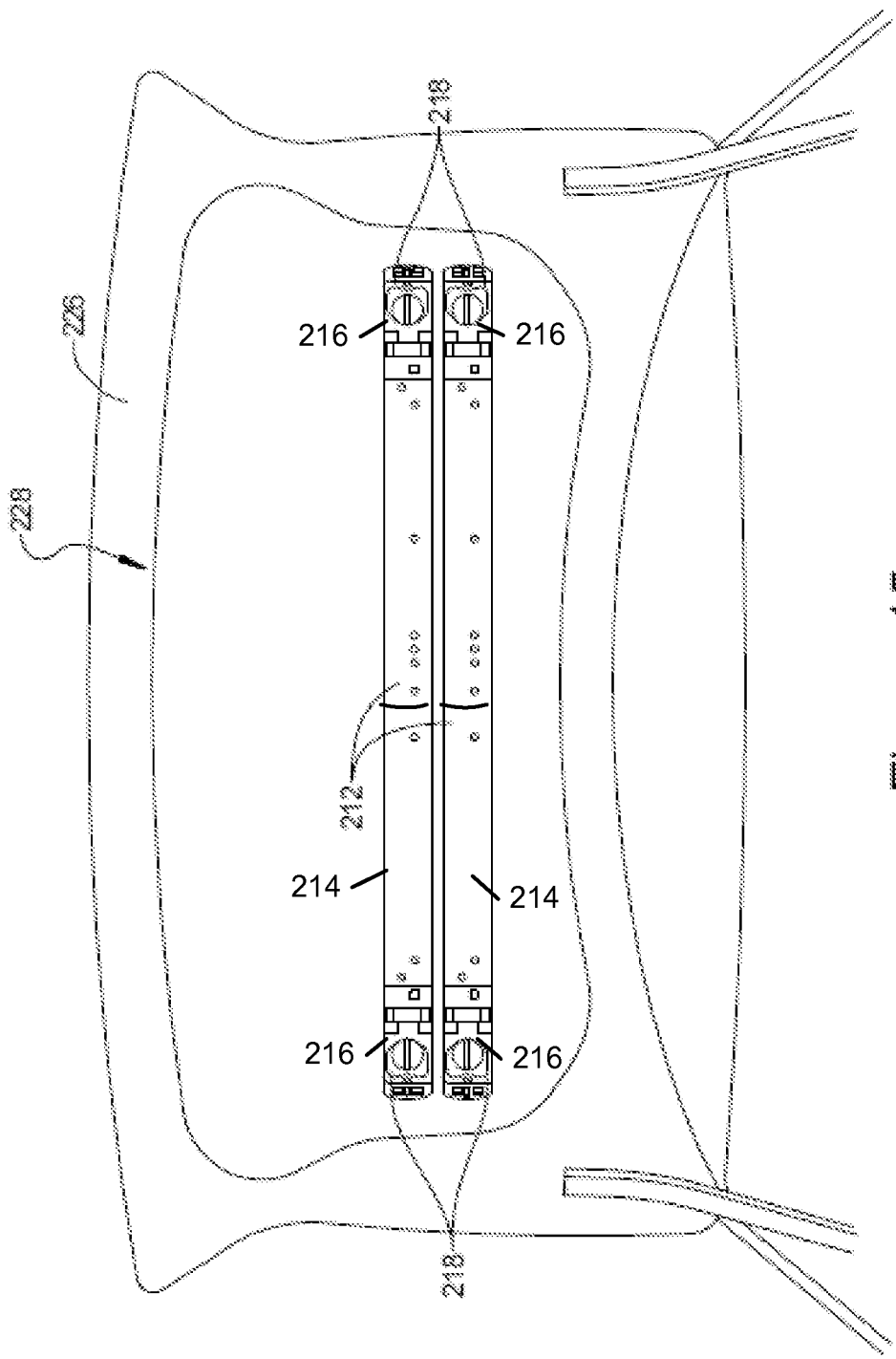
FIG. 15 is a perspective view of view of the cross bar assemblies of FIG. 14 in a stowed position secured to the inside of a trunk lid of the vehicle.

Referring to FIG. 15, the cross bar assemblies 212 are shown in their stowed (i.e., non-operative) positions. In their stowed positions the cross bar assemblies 212 are secured to an underside 226 of a trunk lid 228 of the vehicle 220, with the end support 216 each being generally longitudinally aligned with their respective central telescoping portion 214. This is accomplished by the locking thumbwheels 218 being repositioned on their associated end supports 216 (which will be described in more detail in the following paragraphs), and then attached to the attachment elements 230 on the underside 226 of the trunk lid 228. The mounting fasteners 222 and the attachment elements 230 may comprise any type of component that has a threaded bore and some type of surrounding surface area that enables it to be attached, either by a threaded nut, a different type of fastener, or by welding, within the roof ditch 224 or to the underside 226 of the trunk lid 228. It is possible that different styles or constructions of the mounting fasteners 222 and the attachment elements 230 may be used that are best suited to the specific locations at which they are employed (i.e., either optimized in shape/construction for roof ditch placement or for placement on the underside of a trunk lid).

Referring to FIGS. 16-21, one of the cross bar assemblies 212 is shown in greater detail. The telescoping central portion 214 is made up of a central section 232 and outer sections 234. The central section 232 includes a U-shaped spring locking tab 236 positioned within a channel 237 in the central section 232, near a distal end of the central section. The opposite end of the central section 232 is secured via suitable fasteners 238 to one end of one of the outer sections 234. Each end support 216 has a neck portion 216a that may be secured by one or more fasteners 240 to a distal end of one of the outer sections 234. Each end support 216 also has a main body portion 216b that may accept one of the threaded locking thumbwheels 218 at a first portion 216c thereof, or at a second portion 216d (most clearly visible in FIGS. 19-21). The main body portion 216b of each end support 216 is pivotally secured to its associated neck portion 216a by a suitable pivot pin or other like structure (not shown explicitly in the figures), as will be well understood by those skilled in this art. Optionally, the neck portion 216a may be formed to include an opening 216e that may function to receive a portion of an external tie down strap.

The outer section 234 of the cross bar assembly 212 that does not have the central section 232 secured thereto includes a first hole 242 and a second hole 244. The holes 242 and 244 have diameters that enable a tab portion 246 of the spring locking tab 236 to fit securely therein such that the central section 232 is held stationary relative to its associated outer section 234 regardless of which hole the tab portion 246 is positioned in. The two holes 242 enable the overall length of the cross bar assembly 212 to be fixed at either one of two possible lengths. This is important because when the cross bar assembly 212 is positioned in use on the roof 219 of the vehicle 220, the cross bar assembly needs to span one distance, and when it is stowed on the underside 226 of the trunk lid 228, it needs to span a second distance which is less than the first distance.

Figure 22:
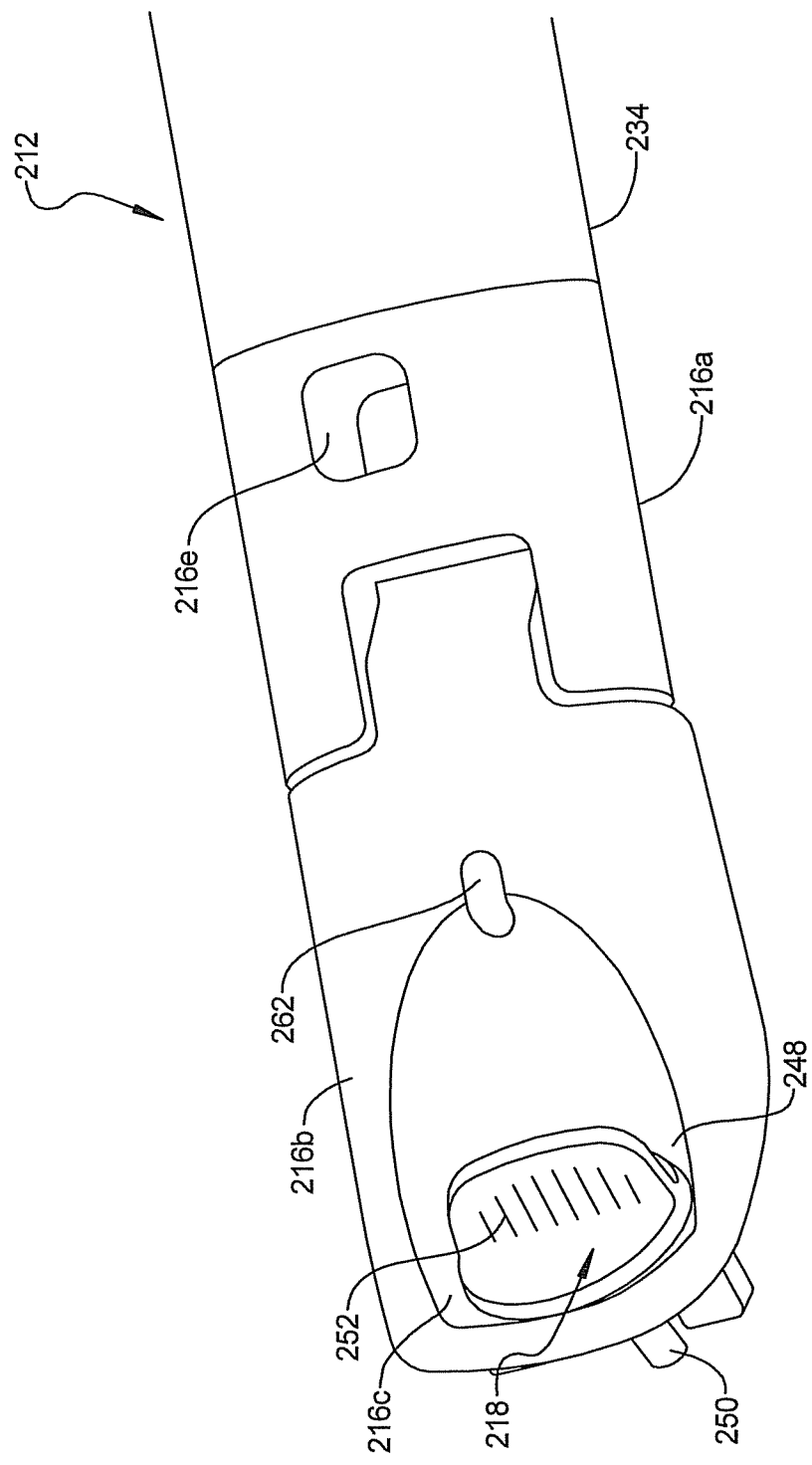
FIG. 22 is a top view of one of the end supports of the cross bar assembly of FIGS. 16-21 illustrating the locking thumbwheel in the position it is placed when the cross bar assembly is to be secured to the vehicle roof for use.
Figure 23:
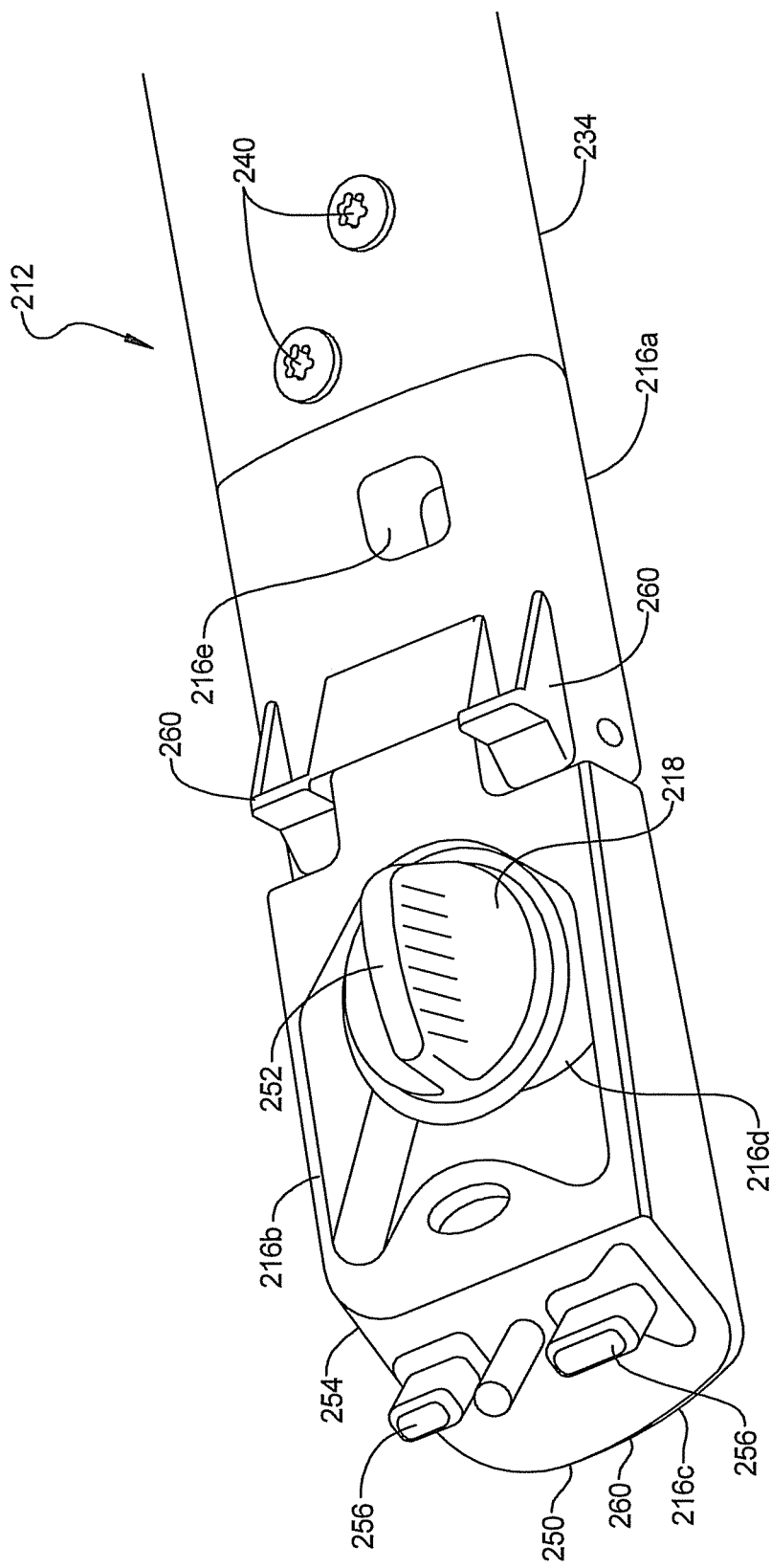
FIG. 23 is a bottom view of the cross bar assembly of FIG. 9 showing the position the locking thumbwheel is placed in when the cross bar is to be secured to the inside surface of the trunk lid for stowage.

Referring now to FIGS. 22 and 23, the construction of one of the end supports 216 can be seen in greater detail. It will be remembered that in this example each of the end supports 216 is identical in construction. In FIG. 22 the first portion 216c of the end support includes a recess or pocket 248 in which the locking thumbwheel 218 can be positioned. Each locking thumbwheel 218 includes a threaded shaft portion 250 that extends through an opening 254 (shown best in FIG. 23), and a manually graspable portion 252 that allows the locking thumbwheel to be easily turned using a thumb and one, or more fingers of one hand. The pivoting feature of the end support 216 enables the central telescoping portion 214 to be positioned above the roof 319 when the cross bar assembly 212 is secured to the mounting fasteners 222 mounted in the roof ditches 224. Alignment posts 256 may be integrally formed with the main body portion 216b and may project from a lower surface 258 of the end support portion 216c to engage in the roof ditch 224 when the end support 216 is secured to the roof 219. One or more shoulder portions 260 may be integrally formed on the neck portion 216a and used as stops to limit pivoting movement of the main body portion 216b when the end support 216 is secured to the roof 219. This helps to prevent lateral motion of the telescoping central section 214 and provide a sturdy, stationary configuration for the cross bar assembly 212 when it is secured to the roof 219.

It will be appreciated that FIG. 23 illustrates the locking thumbwheel in the second portion 216d of the main body portion 216b. In this position the threaded shaft portion 250 would project through an opening 262 (shown in FIG. 22). In this configuration the spacing of the two locking thumbwheels 218 will be closer together and enable their associated cross bar assembly 212 to be secured to the inside surface 226 of the trunk lid 228. In FIG. 23 the threaded shaft portion 250 is also illustrated to show its alignment between the two alignment posts 256. However, it will be understood that in actual practice, the threaded shaft portion 250 would not be present projecting through the opening 254 if the manually graspable portion 352 is positioned as shown in FIG. 23.

From the foregoing it will be appreciated that the cross bar assemblies 212 are able to be quickly and easily released from their operative positions, secured to the roof 219, and then mounted on the inside surface 226 of the trunk lid 228 when not needed. This may be accomplished within minutes without the need for any external tools, and easily by a single individual. Since the trunk lid 228 is typically within easier reach for shorter individuals, demounting the cross bar assemblies 212 and enabling them to be mounted on the inside surface 226 of the trunk lid 228 makes it even easier for shorter individuals to remove and reposition the cross bar assemblies 212 for stowage.

While the foregoing examples describe the system 210 being used with a trunk lid 228 of a sedan motor vehicle, it will be appreciated that the system 210 could just as easily be adapted to allow the cross bar assemblies 212 to be stowed on a vertically moveable lift gate of an SUV, or on a horizontally moveable door component such as used on JEEP® style vehicles.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A vehicle article carrier system for supporting articles above a roof of a vehicle, and wherein the vehicle includes a trunk having a trunk lid, the system comprising:
    a plurality of mounting fasteners adapted to be secured to the roof surface;
    a plurality of attachment elements secured to the trunk lid;
    first and second cross bar assemblies, each one of said first and second cross bar assemblies having:
        a central telescoping section;
        an end support at each end of the central telescoping section, each said end support having a neck portion which his pivotally coupled to a main body portion, and wherein at least one of the neck portion and the main body portion includes a stop portion for limiting pivoting movement of the neck portion to a predetermined degree, and wherein the main body portion is coupled to a respective end of the central telescoping portion, and wherein the neck portion of each said end support includes an associated locking element; and
    wherein in a first configuration, the locking elements of each one of said first and second cross bar assemblies are secured to the plurality of mounting fasteners, to secure the first and second cross bar assemblies above the roof and in position to support articles thereon above the roof, with the end supports of each of the first and second cross bar assemblies extending non-parallel to the central telescoping portion;
    wherein in a second configuration, the first and second cross bar assemblies each have their said locking elements secured to the attachment elements on the trunk lid, to support the first and second cross bar assemblies from the trunk lid and such that said first and second cross bar assemblies are secured on the trunk lid parallel to one another and adjacent to one another; and
    wherein the first and second cross bar assemblies each are configured to enable a telescoping action to enable each said cross bar assembly to be configured with a first length when positioned on the mounting fasteners, and a second length which is less than the first length when secured to the trunk lid.

2. The system of claim 1, wherein the first cross bar assembly has an aerodynamically shaped leading edge, and a trailing edge;
    and wherein the second cross bar assembly has a leading edge shaped to nest with the trailing edge of the first cross bar assembly when the first cross bar assembly and the second cross bar assembly are positioned in abutting engagement with one another;
    and wherein the first cross bar assembly and the second cross bar assembly cooperatively form an aerodynamic spoiler when positioned in abutting engagement with the trailing edge of the first cross bar assembly being in contact with the leading edge of the second cross bar assembly.

3. The system of claim 2, wherein the trunk lid includes a plurality of additional attachment elements for engaging with the locking elements of the second cross bar assembly.

4. The system of claim 3, wherein the attachment elements for supporting the first and second cross bar assemblies from the trunk lid are all accessible from an outer surface of the trunk lid.

5. The system of claim 3, wherein the attachment elements are accessible from an inside surface of the trunk lid and serve to suspend the first and second cross bar assemblies from the inside surface of the trunk lid when the first and second cross bar assemblies are secured to the attachment elements, to thus enable the first and second cross bar assemblies to be stowed in the trunk when not needed for use.

6. The system of claim 1, wherein the locking elements of each of the first and second cross bar assemblies comprise locking thumbwheels.

7. The system of claim 1, wherein the mounting fasteners are disposed in roof ditch portions of the roof of the vehicle.

8. The system of claim 1, wherein each of the end supports includes a removable cover that covers the locking element when the removable cover is secured to its associated said end support.

9. A vehicle article carrier system for supporting articles above a roof of a vehicle, and wherein the vehicle includes a trunk having a trunk lid, the system comprising:
    a plurality of mounting fasteners adapted to be secured to the roof surface;
    a plurality of attachment elements secured to the trunk lid;
    first and second cross bar assemblies each having a pair of pivotally supported end supports at opposing ends of a central telescoping portion thereof, each said end support having;
        a main body portion coupled to a respective end of the central telescoping portion;
        a neck portion pivotally coupled to the main body portion, and wherein at least one of the neck portion and the main body portion include a stop portion for limiting pivoting movement of the neck portion to a predetermined degree when the cross bar assembly is secured to the mounting fasteners; and
        a locking element and the cross bar assemblies being telescopic to provide a plurality of different overall lengths;
    wherein in a first configuration, the locking elements are secured to the plurality of mounting fasteners, to secure the cross bar assemblies above the roof with the cross bar assemblies configured to have a first overall length, and being in position to support articles thereon above the roof; and
    wherein in a second configuration, the first and second cross bar assemblies are secured such that the attachment elements of each of the first cross bar assembly and the second cross bar assembly are secured to the attachment elements on the trunk lid, to thus support the first and second cross assemblies from the trunk lid, and such that the cross bar assemblies have a second overall length which is less than the first overall length;
    the first cross bar assembly includes an aerodynamically shaped leading edge, and a trailing edge; and the second cross bar assembly includes a leading edge and a trailing edge; and where the trailing edge of the first cross bar assembly has a shape that is complementary to the leading edge of the second cross bar assembly such the first and second cross bar assemblies can be nestably secured adjacent one another; and wherein the first and second cross bar assemblies cooperatively form a spoiler when nestably secured adjacent to one another on the trunk lid.

10. The system of claim 9, wherein an additional plurality of attachment elements are accessible from an inner surface of the trunk lid, and the cross bar assemblies are secureable to the inner surface of the trunk lid and parallel to one another and in close proximity to one another, and thus stowed inside the trunk of the vehicle when disposed in the second configuration.

11. The system of claim 9, wherein the mounting fasteners are adapted to be disposed in a pair of roof ditches of the roof of the vehicle.

12. The system of claim 9, wherein each of the first and second cross bar assemblies includes a telescopic central portion, where the end supports of each said cross bar assembly are pivotally secured to its respective said telescopic central portion.

13. The system of claim 9, wherein:

each of the end supports includes a cover that may be manipulated by a user to gain access to the locking element associated with the end support; and wherein each of the locking elements includes a rotatable element that is able to be rotated to engage the mounting fasteners or the attachment elements.

\* \* \* \* \*